United States Patent
Stava

(10) Patent No.: US 6,956,185 B2
(45) Date of Patent: Oct. 18, 2005

(54) TANDEM ELECTRODE WELDER AND METHOD OF WELDING WITH TWO ELECTRODES

(75) Inventor: Elliott K. Stava, Sagamore Hills, OH (US)

(73) Assignee: Lincoln Global, Inc., Cleveland, OH (US)

(*) Notice: Subject to any disclaimer, the term of this patent is extended or adjusted under 35 U.S.C. 154(b) by 129 days.

(21) Appl. No.: 10/650,522

(22) Filed: Aug. 28, 2003

(65) Prior Publication Data

US 2004/0050833 A1 Mar. 18, 2004

Related U.S. Application Data

(63) Continuation of application No. 10/225,514, filed on Aug. 21, 2002, now Pat. No. 6,683,278, which is a continuation of application No. 09/730,937, filed on Dec. 6, 2000, now Pat. No. 6,489,592, which is a continuation of application No. 09/336,804, filed on Jun. 21, 1999, now Pat. No. 6,207,929.

(51) Int. Cl.$^7$ ............................................... B23K 9/09
(52) U.S. Cl. .............................. 219/137 PS; 219/130.51
(58) Field of Search ..................... 219/130.51, 137 PS

(56) References Cited

U.S. PATENT DOCUMENTS

| | | |
|---|---|---|
| 3,382,345 A | 5/1968 | Normando |
| 3,420,979 A | 1/1969 | Gowan |
| 3,627,978 A | 12/1971 | Endo et al. |
| 4,246,463 A | 1/1981 | Shutt et al. |
| 4,806,735 A | 2/1989 | Ditschun et al. |
| 4,861,965 A | 8/1989 | Stava |
| 4,947,021 A | 8/1990 | Stava |
| 5,001,326 A | 3/1991 | Stava |
| 5,155,330 A | 10/1992 | Fratiello et al. |
| 5,349,157 A | 9/1994 | Blankenship |
| 5,349,159 A | 9/1994 | Mita et al. |
| 5,351,175 A | 9/1994 | Blankenship |
| 5,434,768 A | 7/1995 | Jitaru et al. |
| 6,051,810 A * | 4/2000 | Stava ................ 219/137 PS |
| 6,207,929 B1 | 3/2001 | Stava |

FOREIGN PATENT DOCUMENTS

| | | |
|---|---|---|
| DE | 37 35 834 | 4/1989 |
| DE | 3735834 C | 4/1989 |
| EP | 0 435 673 | 7/1991 |

* cited by examiner

*Primary Examiner*—Clifford C. Shaw
(74) *Attorney, Agent, or Firm*—Fay, Sharpe, Fagan, Minnich & McKee; Brian E. Turung; Robert V. Vickers

(57) ABSTRACT

An electric arc welding apparatus comprising at least a first consumable electrode and a second consumable electrode movable in unison along a welding path between the edges of two adjacent, mutually grounded plates, a first power supply for passing a first welding current at a first low frequency between the first electrode and the two plates, a second power supply for passing a second welding current at a second low frequency between the second electrode and the two plates, where each of the power supplies includes a three phase voltage input operated at line frequency, a rectifier to convert the input voltage to a DC voltage link and a high frequency switching type inverter converting the DC voltage link to a high frequency AC current, an output rectifier circuit to provide a positive voltage terminal and a negative voltage terminal, and an output switching network operated at a given low frequency for directing a pulsating welding current at the given low frequency from the two terminals across one of the electrodes and the plates, and a circuit for independently adjusting the given low frequency so the value of the first low frequency of the first power supply is different from the second low frequency of the second power supply.

50 Claims, 8 Drawing Sheets

TANDEM ELECTRODE WELDER AND METHOD OF WELDING WITH TWO ELECTRODES

The present patent application is a continuation of U.S. patent application Ser. No. 10/225,514 filed Aug. 21, 2002, now U.S. Pat. No. 6,683,278, which in turn is a continuation of U.S. patent application Ser. No. 9/730,937 filed Dec. 6, 2000, now U.S. Pat. No. 6,489,592, which in turn is continuation of U.S. patent application Ser. No. 09/336,804 filed Jun. 21, 1999, now U.S. Pat. No. 6,207,929.

The present invention relates to the art of electric arc welding and more particularly to a welding apparatus using two consumable electrodes and the method of welding with tandem consumable electrodes.

INCORPORATION BY REFERENCE

The present invention utilizes a high frequency inverter of the transistor switching type for converting a three phase input power source to a load coupling transformer from which the AC output of the inverter may be rectified to create current flow between the electrode and workpiece of a welding operation. Such welders employ a pulse width modulator operated at over 18 kHz for controlling the magnitude of the welding current flowing through the welding operation. These inverters are well known in the art and are generally shown in Blankenship U.S. Pat. No. 5,349,157 and Blankenship U.S. Pat. No. 5,351,175, which patents are incorporated by reference herein as background information. They illustrate a three phase inverter with current controlled by a high frequency pulse width modulator directing current pulses to the output transformer of the inverter. The three phase inverter has a pulse width modulator operated by an error amplifier for controlling the current at the output of the inverter. Output switching networks in arc welders for creating AC welding current from DC terminals are disclosed in Stava U.S. Pat. No. 4,861,965 and Stava U.S. Pat. No. 4,947,021, also incorporated by reference herein. Shutt U.S. Pat. No. 4,246,463 and Fratiello U.S. Pat. No. 5,155,330 show tandem mounted consumable electrodes used for welding the joint between two spaced plates. These patents are also incorporated by reference as background information, since they relate to the field to which the present invention is directed.

BACKGROUND OF INVENTION

The present invention relates to an electric arc welder of the type using two consumable electrodes for welding the joint between two edges of relatively thick plates, which plates may be in the form of the cylindrical ends of two pipe sections being welded together in a pipe welding operation or, in practice, seam welding of a formed plate into a pipe. In such welding procedures, two tandem mounted consumable electrodes are moved in unison along the joint so two layers of molten metal are deposited first from the front electrode and then from the trailing electrode to fill the joint between the two beveled edges of the adjacent edges of the plate forming a pipe. These edges are hereinafter referred to as adjacent plates for global application. The invention is applicable for seam welding of pipe; however, pipe welding will be described in a welding operation where the ends of the pipe sections are welded together. The invention is much broader in application and may be used to butt weld two adjacent heavy plates, such as the plates forming sections of gantries for oil rigs, armor of plates used in ship building or seam welding of pipe. Tandem consumable electrodes deposit large amounts of molten metal and cause the metal to be fused in the joint between the plates at high rates as necessary in welding heavy plates. In the past, a single phase power supply was normally used to produce the welding current for both of the tandem electrodes. The frequencies of the welding operation for the adjacent electrodes were the same causing extreme arc generated interference. Such systems required elaborate connections, for instance a Scott connection that produce an electrical phase shift. The frequencies of the welding procedures were dictated by the line frequency of the single phase input power supply. Thus, the frequencies of the pulsating welding current for the tandem mounted electrodes was generally the same fixed value determined by the 50 Hz or 60 Hz input voltage. The prior art welders using tandem consumable electrodes had generally caused an unbalance in the three phase power system and had welding frequencies controlled by the line frequency of the input voltage. This limitation was extremely detrimental when the high currents of pipe welding were used, which high currents exceed about 200 amperes and were often as high as about 1000–1200 amperes, or more. When tandem mounted electrodes are subject to relatively fixed low frequencies, determined by the line frequency, and conduct extremely high currents, used in pipe welding and welding thick plates, arc interference presents a serious problem requiring complicated connections and shielding. In the prior devices, it was somewhat normal practice for each of the electrodes to be driven by current having the same frequency, such as 50 Hz or 60 Hz. The only way to reduce arc interference was to shift the phase of the line current being directed to each of the tandem electrodes. This procedure was extremely complicated. The process was dictated by the line frequency and the phase shifting did not fully alleviate arc interference. Increasing the frequency of the welding current above 100–200 Hz to reduce interference was not practical in the prior systems. Thus, there is a substantial need for an improved electric arc welder using two or more consumable electrodes which do not have the problem of arc interference and do not utilize high current pulse frequencies.

THE INVENTION

The present invention overcomes the problems experienced in efforts to provide an electric arc welder that can effectively utilize two consumable electrodes, while reducing or generally eliminating arc interference without requiring high frequencies for the welding current. Although the invention can be used in a DC mode, preferably it involves an electric arc welder that directs AC welding currents to two separate consumable electrodes, which welder can be driven by a single three phase power supply while the welding operation at each electrode is independently controlled. The frequency of the welding current for each of the two electrodes is independently controlled and does not depend upon the input line frequency. By using the present invention, a three phase input voltage is used for a tandem electrode welder. Thus, there is a balanced input power, not an unbalanced single phase as in the prior art. The three phase voltage input has a line frequency of 50 Hz or 60 Hz; however, this frequency does not dictate the frequency of the welding current at each consumable electrode. This welder develops high welding current for heavy plates with the current exceeding about 200 amperes and is normally at least about 1000 amperes. Although two tandem mounted consumable electrodes are used in the preferred embodiment, it is possible to use three or more electrodes in the electric arc welder of the present invention.

In accordance with the invention, the electric arc welder includes a first and second consumable electrode, which electrodes are moved in unison along a welding path between the edges of the two adjacent mutually grounded plates, such as the seam in a pipe manufacturing operation. There are two separate power supplies for passing welding currents between the individual electrodes and the plates forming the grounded workpiece of the welding operation. The power supplies each are constructed to provide low frequency current pulses for the welding operation performed by the individual electrodes. In the preferred embodiment, the power supplies include a three phase voltage input, which input is operated at line frequency, such as 50 Hz or 60 Hz. Since the line frequency is isolated and does not control the output frequency at the individual electrodes, the same three phase voltage source can be used for both power supplies separately controlling the tandem mounted electrodes. The three phase power supply is rectified to convert the input voltage to a DC voltage link and a high frequency switching type inverter converts the DC voltage link to a high frequency AC current. The high frequency switching type inverter is controlled by a pulse width modulator operated at a frequency generally greater than 20 kHz with a duty cycle that is adjusted to control the magnitude of the output current at the electrodes. The high frequency AC current forming the output of the high frequency switching type inverter is directed through an output or load transformer having a secondary winding for driving an output rectifier circuit to provide a positive voltage terminal and a negative voltage terminal. As so far described, each of the individual power supplies for each of the two consumable electrodes is driven by the same three phase source, but creates individual outputs in the form of a positive terminal and a negative terminal. In the specific power supply used in the present invention, the output terminals provide power to a switching network driven at a given low frequency for directing the polarity of the welding current from the terminals of the power supply across one of the electrodes and the two spaced plates forming the workpiece of the welding operation. By using an independently controlled output switching network at the output side of a standard high frequency inverter, the frequency of the welding current, if AC or pulsating DC, is independently controlled by the output switching network so the power supply components before the switching network produce a DC current. The frequency at the output of the power supply that controls the frequency of the current in each electrode is independently controllable and not dependent upon either the input frequency of the power supply or the frequency of the welding current used by the other electrode. This operational isolation frees the tandem electrode electric arc welder to allow individual control of the welding current frequency for each of the separate and distinct consumable electrodes. By this architecture for the electric arc welder, the low frequencies at the two electrodes can be controlled to less than 300 Hz and preferably in the general range of 5–200 Hz. The invention is also operative to provide DC current, either continuous or pulsing in both polarities. Three phase input voltage is used, thus allowing balanced operation of the welder without dictating the frequency of the welding currents.

In accordance with another aspect of the present invention there is provided an electric arc welding apparatus comprising at least a first consumable electrode and a second consumable electrode movable in unison along a welding path between the edges of two adjacent, mutually grounded plates. A first power supply is provided for passing a first welding current at between the first electrode and the plates and a second power supply is provided for passing a second welding current between the second electrode and the plates. Each said power supply includes a three phase voltage input operated at line frequency, a rectifier to convert the input voltage to a DC voltage link and a high frequency switching type inverter converting the DC voltage link to a high frequency AC current, an output rectifier circuit to provide a positive voltage terminal and a negative voltage terminal, and an output switching network operated for directing welding current from the terminals across one of the electrodes and the plates, and a circuit for independently adjusting the output switching networks so the value of the first welding current of the first power supply is different from the second welding current of the second power supply. The switching networks can maintain a continuous DC current of either polarity or an AC current at a low frequency by alternating the switches of the network.

The individual power supplies include circuits for setting the low frequency used by each of the separate electrodes. In accordance with an aspect of the invention, at least one of the power supplies includes means for causing the low frequency of that power supply to vary as a function of time. By using this concept, one of the electrodes is operated at a fixed frequency below about 200 Hz, while the other electrode is operated at a frequency that continues to vary between two extremes, such as 10 Hz to 300 Hz. By varying the low frequency of one power supply between two extremes, while the low frequency of the other power supply is fixed, there is only one frequency at which the two electrodes have identical frequencies. In accordance with another aspect of the present invention, the low frequencies of both electrodes are varied as a function of time, but not in synchronization. Thus, the frequency of the welding current at one electrode sweeps between 10 and 300 Hz. At the same time, the welding current of the other tandem mounted electrode sweeps between 10 and 300 Hz. This sweeping of the electrode welding frequency prevents arc interference and does not require complicated connections. In accordance with still another aspect of the present invention, the inverter between the three phase input voltage and the low frequency welding current is operated at an extremely high frequency, i.e. at least about 20 kHz. This is standard operation for a high frequency switching inverter. The invention uses the inverter stage to isolate the electrically separate input power from the welding parameters for each tandem mounted electrode. The output welding current is pulsating. It can be either low frequency DC pulses or low frequency AC pulses or continuous DC current of either polarity. Indeed, in one example, the low frequency pulses at one electrode are DC pulses, whereas the low frequency pulses at the other electrode are AC pulses. The frequency of the pulses is varied progressively or sweep between 50 and 200 Hz so there is no arc interference caused by beating of the frequencies used in the closely positioned consumable electrodes.

A variety of architectures can be employed for creating the individual power supplies. In accordance with the preferred embodiment, each power supply includes an inverter for converting the AC three phase voltage to a DC current source output having a maximum current of at least 200 amperes with a positive output terminal and a negative output terminal to provide DC energy to an output switching network. The network, in the preferred embodiment of the present invention, includes a first transistor based switch in series with the positive terminal of the power supply, a series inductor segment, one of the electrodes and the spaced plates or workpiece. By closing this series circuit, a pulse of a first polarity is directed to the welding operation. The network also includes a second transistor based switch in series with the negative terminal, a second inductor segment, the same electrode and the plates. Such switching networks are shown in Stava U.S. Pat. No. 4,861,965 and Stava U.S. Pat. No. 4,947,021. Control means ultimately turn the first switch ON and the second switch OFF at a first switch reversing point and turn the second switch ON and the first switch OFF at a second switch reversing point. Consequently, AC high welding current is created with alternate positive and negative current pulses. This switch network creates the low frequency welding current for one of the electrodes. The same architecture is used to create the low frequency welding current of the other electrode. By merely adjusting the control means of the two power supplies, the frequency of the welding current is adjusted. Other electrical architectures can be used for the power supplies so long as they have an input voltage operated at line frequency, an inverter to convert the input voltage to a DC voltage link and a high frequency switching type inverter for converting the DC voltage link to a high frequency AC current that is rectified by a circuit to provide a positive voltage output terminal and a negative voltage output terminal. These terminals are used for directing DC energy to the switching network. Thus, the power supply is driven by a three phase voltage source at a line frequency, but creates the desired low frequency output current. The ability to control the low frequencies of the output currents independent of each other results in an improved tandem electrode electric arc welder.

Another aspect of the present invention involves use of a first and second power supply for driving first and second consumable electrodes moved in unison in the joint between two plates. Each of the power supplies have switch networks for creating low frequency welding currents. By generating a synchronizing signal with a given frequency determined by the rate of synchronizing commands, the power supplies are forced to a given polarity when a synchronizing command, such as a logic 1 or a positive going leading edge, is presented to the switching network of the power supply. By delaying the synchronizing signal at one of the power supplies, the low frequency of that power supply is offset or phase shifted. Consequently, by use of a synchronizing signal and a delay circuit, the low frequencies of the welding currents are out of phase. Using a synchronizing signal, the alternating weld current is forced to a given polarity at the time of a command in the signal. In one embodiment, the synchronizing signal is a positive command and a negative command. When the switching circuit receives a positive command, the weld current is forced to positive polarity. The negative command forces the weld current to a negative polarity. Since the synchronizing signal is delayed at one power supply, the forcing action of the command makes low frequency welding currents which are out of phase. This is done without a Scott connection. As another aspect, the synchronizing command starts a weld current oscillating at a given frequency created at the power supply. This given frequency produces alternations between synchronizing commands or between a positive command or a negative command.

The primary object of the present invention is the provision of an improved tandem electrode electric arc welder, which welder can be used for seam welding pipe from a rolled plate and similar welding operations employing pulsating high welding currents without arc interference.

Yet another object of the present invention is the provision of an electric arc welder, as defined above, which welder includes separately driven consumable electrodes, each of which is driven by a high welding current having a low frequency with the frequencies being adjusted or varied on a time basis or is operated at a given DC polarity.

Still a further object of the present invention is the provision of an electric arc welder, as defined above, which electric arc welder utilizes a three phase input voltage allowing balancing of the input power for the welding operation. Such input power balancing is extremely important when using extremely high currents, as needed for welding the seam of a pipe.

Still a further object of the present invention is the provision of an improved electric arc welder, as defined above, which electric arc welder can use tandem consumable electrodes without unbalancing the power source or creating undue arc interference.

These and other objects and advantages will become apparent from the following description taken together with the accompanying drawings.

PREFERRED EMBODIMENT

Figure 1:
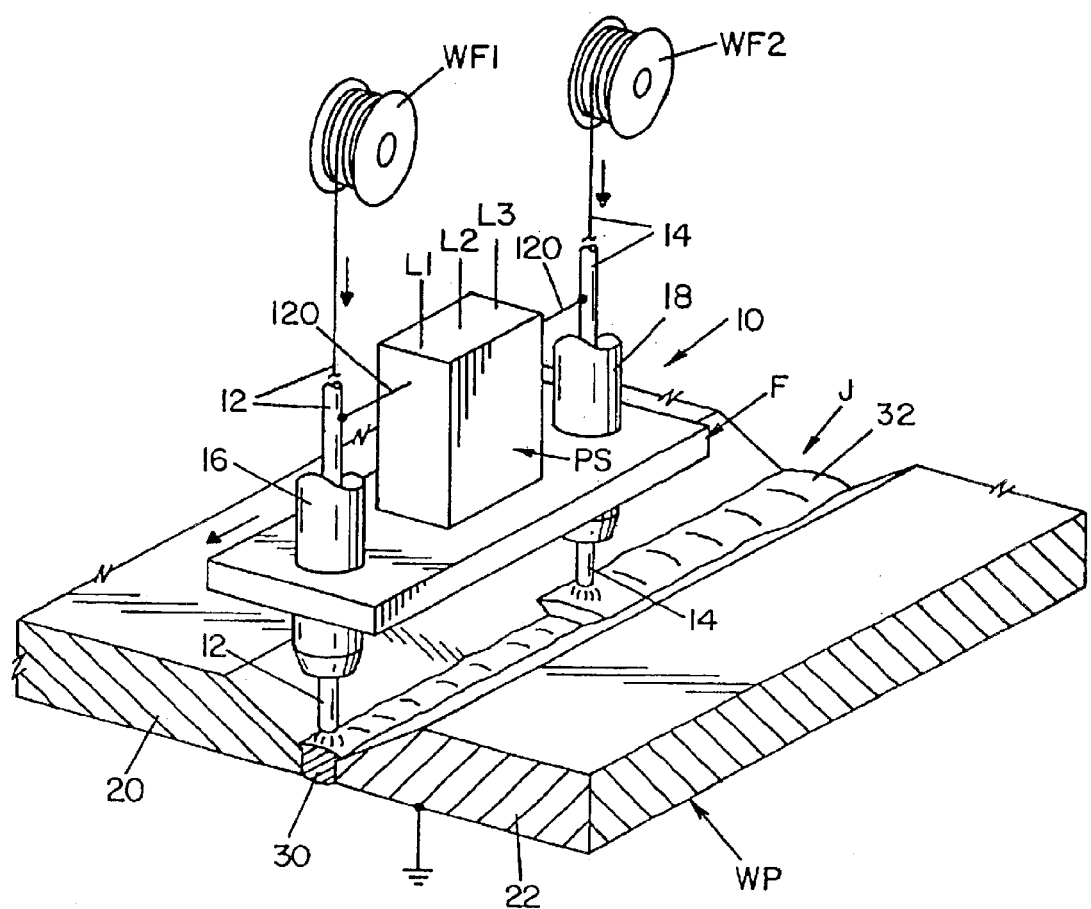
FIG. 1 is a pictorial view schematically illustrating a tandem consumable electrode type welder.

Referring now to the drawings wherein the showings are for the purpose of illustrating the preferred embodiment of the invention only, FIG. 1 shows a welder 10 including tandem mounted consumable electrodes 12, 14 in the form of welding wires advancing from supply reels WF1, WF2, respectively. Tandem electrodes 12, 14 are pushed through contact holders 16, 18 forming electrical contacts that provide pulsating, low frequency welding current between electrodes 12, 14 and spaced heavy plates 20,22. These plates are the workpiece WP of the welding operation. Electrodes 12, 14 are moved in unison by schematically illustrated frame F to travel along a path defined by joint J between the spaced edges of plates 20,22 to form a weld bead 30 overlaid by bead 32. The plates are joined at beads 30, 32. In the preferred embodiment, plates 20, 22 are the adjacent edges of a cylindrical pipe to weld the edges into a pipe. Frame F is transported by a tractor riding on a track to move electrodes 12, 14 along joint J. Metal is deposited in the joint between the edges of the rolled plate to weld the plate together when cylindrical pipe is being manufactured. FIG. 1 shows power supply PS which is powered by a three phase input voltage source from input lines L1, L2 and L3. The voltage input lines provide the energy used to create the low frequency welding current in accordance with the invention. By employing tandem electrodes 12, 14 a large amount of metal is deposited in beads 30, 32 between plates 20, 22 as tractor F moves along the plates. In accordance with the invention, power supply PS is divided into two separate and distinct individual power supplies PS1, PS2 to provide power to the individual tandem mounted electrodes 12, 14, respectively. Power supply PS is shown in detail in FIG. 2 wherein first power supply PS1 is shown in detail. Second power supply PS2 is a duplicate of power supply PS1 and is thus illustrated only graphically. The description of first power supply PS1 applies equally to second power supply PS2.

Referring now to dedicated power supply PS1. This power supply, in the preferred embodiment, includes an inverter stage 40 including a high frequency switching type inverter 42 provided with power from three phase voltage source 44 having a frequency of 50 or 60 Hz according to the local line frequency. The AC input voltage is rectified by rectifier 46 to provide a DC link 48 directed to the input of inverter 42, which is operated at a high frequency in excess of 18 kHz. The output or load of inverter 42 is transformer 50 having primary winding 52 and secondary winding 54 with a grounded center tap 56 connected to ground 58. High frequency pulses at the input of transformer 50 are drastically higher than line frequency at voltage input 44 to reduce the size of the components necessary for the inverter. Secondary winding 54 is directed to rectifier circuit 60 having diodes D1, D2, D3 and D4 to create a positive output terminal 62 and a negative output terminal 64 connected to the output switching network 70. The switching network operates at a low frequency of less than 200–300 Hz. Output switching network 70 includes two transistor type switches SW1 and SW2, usually in the form of IGBT's that can be turned on and off according to the logic on base lines 116, 118. To dissipate high voltages when switches SW1, SW2 are off, snubber networks 100, 102 are connected across the switches. Network 70 is used for pulsating high welding currents substantially over 200 amperes. A single output inductor 110 is divided into positive pulse section 112 and negative pulse section 114. In this manner, an AC current is created in output lines 120, 122 connected to electrode 12 and grounded plates 20, 22. A simplified circuit illustrating the invertor stage 40, the switches SW1, SW2 and inductor 110 is shown in FIG. 2A. Power supply PS2, shown in the bottom portion of FIG. 2, has output line 120 connected to tandem electrode 14 and output line 122 also connected to the grounded base plates 20, 22. By alternating the logic on base control lines 116, 118 in succession, an alternating current is applied to the welding circuit of the individual tandem mounted electrodes. Inverter 42 is controlled by microprocessor controller 200, which controller is somewhat standard. It has output to control pulse width modulator 202, driven by oscillator 204. The oscillator in practice has a frequency exceeding 18 kHz and preferably has a frequency in the range of 20–40 kHz. Consequently, the switching inverter 42 operates at a high frequency in excess of 20 kHz to convert the three phase input voltage at source 44 into a high frequency current output at primary winding 52 of transformer 50. The pulse width modulator is operated at the frequency of oscillator 204 by pulses on control line 206. The duty cycle of the individual pulses controls the amount of current being created by inverter 42 and is determined by the voltage on input line 210 which is the output of error amplifier 212 generating a voltage according to the difference between a voltage representing actual arc current from shunt 220 by way of line 222. Feedback circuit 224 applies a voltage on input 226 that represents the instantaneous arc current or voltage. A second input 230 is the wave shaping output signal from controller 200. The relationship between input 226 and input 230 at error amplifier 212 determines the voltage on line 210 and, thus, the duty cycle at any given time for pulse width modulator 202. This control circuit is standard architecture for a switching type inverter so the current being transmitted by inverter 42 is controlled in accordance with the output signal on line 230 of controller 200.

Figure 2:
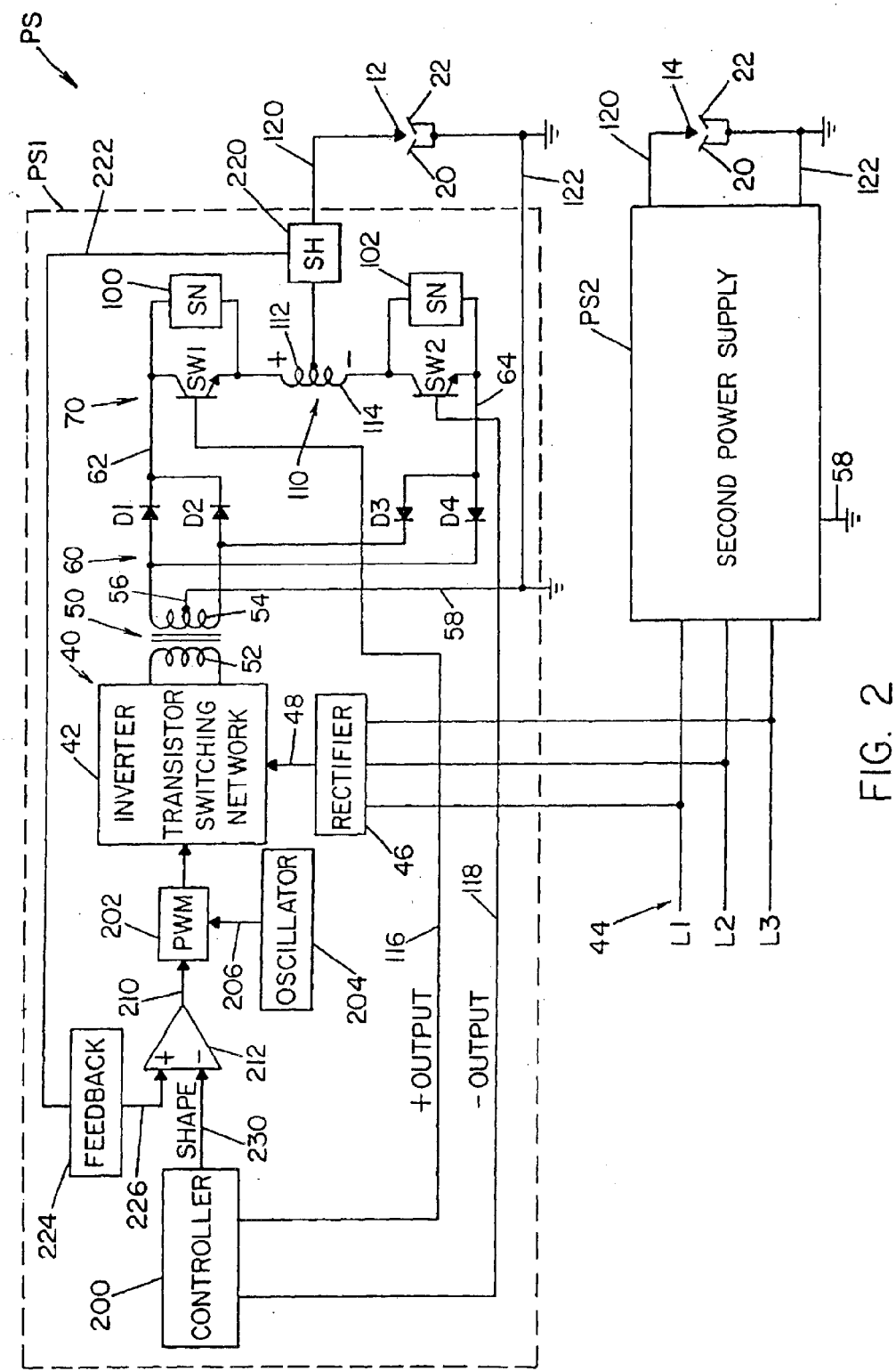
FIG. 2 is a wiring diagram showing the two power supplies for providing pulsating welding current for each of two tandem mounted consumable electrodes.
Figure 2A:
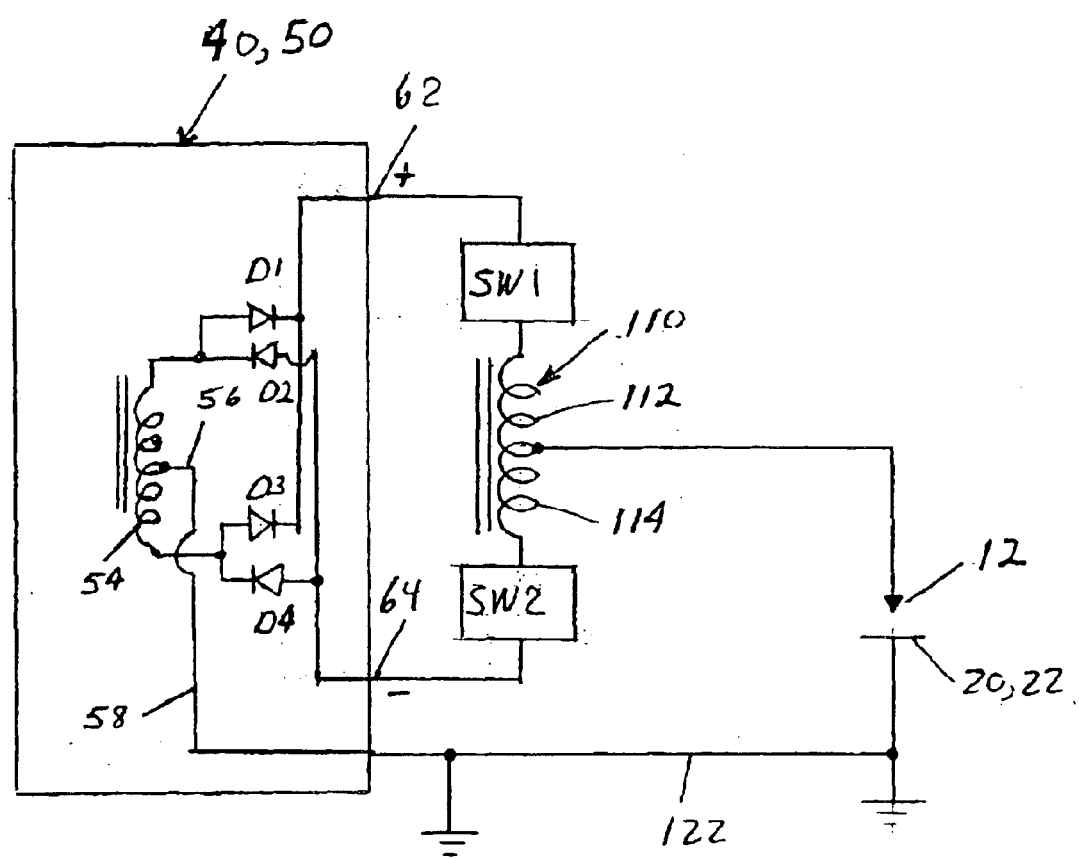
FIG. 2A is a simplified wiring 2 diagram of a portion of the wiring diagram of FIG. 2 which illustrates polarity control of the current after the current has been rectified.

By using the power supplies PS1 and PS2 as shown in FIG. 2, both of which are driven by input voltage source 44, a controlled low frequency alternating current is created at each electrode 12, 14. The low frequency is determined by the frequency at which the logic alternates on base control lines 116, 118. The logic on these lines is generated by a software program or subroutine processed by a microprocessor in controller 200. This program is schematically illustrated as a hardwired circuit in FIG. 3. As an additional operation output switching network 70 of each power supply can be operated as a DC welder by closing either switch SW1 or SW2 while the other switch is opened. In this DC operation the current is controlled by the voltage on input line 230. Indeed, the voltage on line 230 can be controlled to produce a selected DC wave slope through the closed switch SW1 or SW2.

Figure 3:
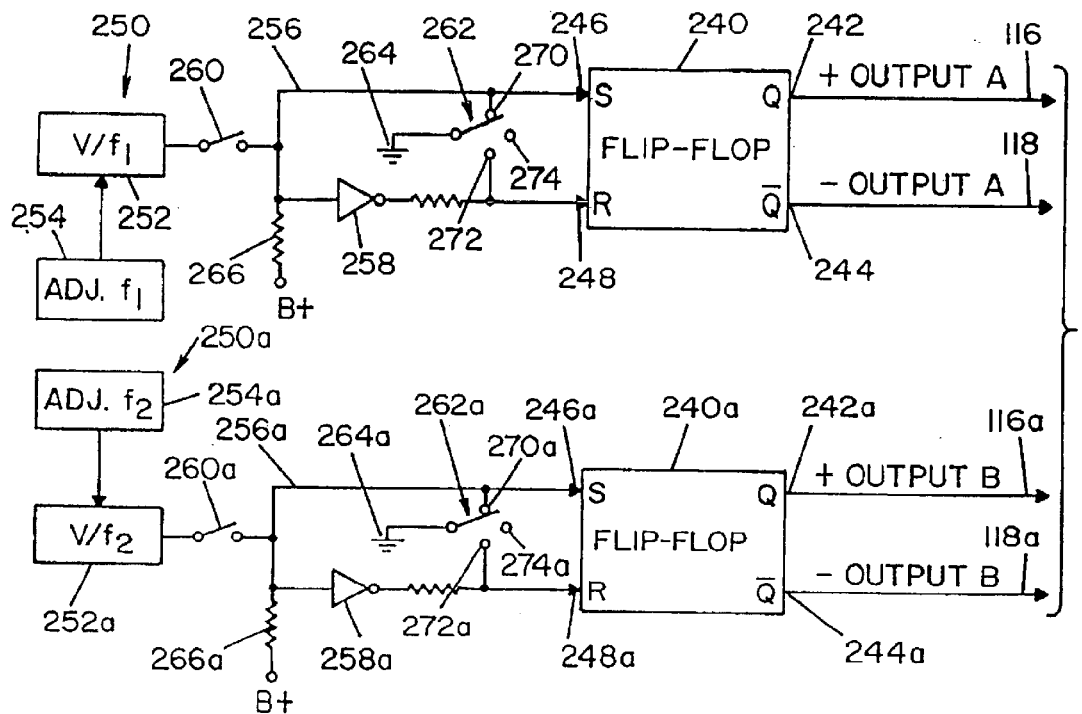
FIG. 3 is a wiring diagram schematically illustrating the control circuit for independently adjusting the low frequencies for the tandem electrodes of the preferred embodiment of the present invention.
Figure 4:
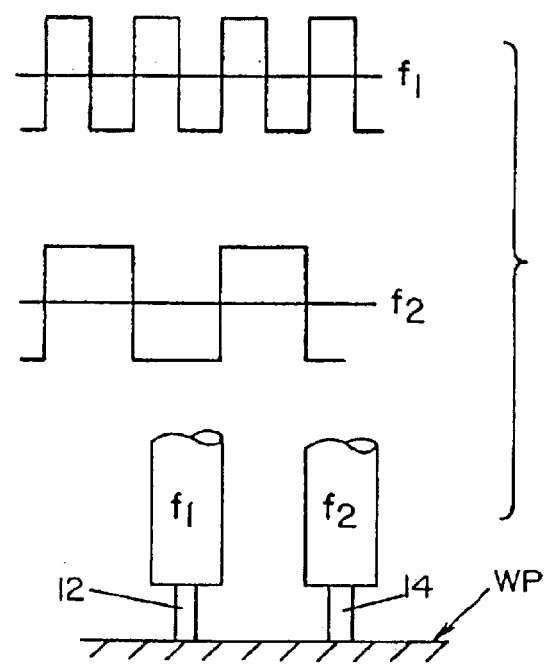
FIG. 4 is a view comprising two pulse curves above a schematic illustration of tandem electrodes using the currents of pulse curves.

Referring now to FIG. 3, the control for power supplies PS1 and PS2 are illustrated as hardwired flip-flops 240 and 240a, respectively. Details of flip-flop 240 will b described. This description applies equally to flip-flop 240a, wherein the elements have the same number, but are designated with the subscript a. Flip-flop 240 is a software program to produce alternating logic in base control lines 116, 118 at a desired frequency. Flip-flop 240 controls the alternate switching of switches SW1 and SW2 at a low frequency to produce a low frequency output for network 70 as shown in FIG. 2. The logic in lines 116, 118 is the output of non-coincident terminals 242,244 of flip-flop 240. The logic on these terminals is alternated according to the logic at either the set terminal 246 or the reset terminal 248. To change the logic on lines 116, 118 the logic on terminals 246,248 are reversed at a frequency determined by the control circuit 250 in the form of a software voltage frequency oscillator 252 having an output frequency determined by the setting or adjusted voltage of control circuit 254 for frequency $f_1$. This is the low frequency for alternating the logic on lines 116, 118. This is the frequency of the welding current at electrode 12. The output of the voltage control oscillator 252 is the logic on line 256 connected to set terminal 246 and through inverter 258 to reset terminal 248. A positive pulse at the output of oscillator 252 sets flip-flop 240 to create a logic 1 in line 116. A logic 0 at the output of oscillator 252 has the reverse effect and creates a logic 1 at terminal 248 and, thus, a logic 1 at the inverted output terminal 244 to produce a logic 1 inline 118. A logic 1 inline 116 or line 118 turns on the switch SW1 or SW2. When the logic 1 shifts to the opposite output line, the transistor type switch shifting to a base at logic 0 immediately turns off. Thus, by adjusting the output of circuit 254, frequency $f_1$ of network 70 in PS1 is determined. In a like manner, adjusting the frequency by changing circuit 254a produces a desired frequency $f_2$ for consumable electrode 14. In accordance with the invention, a software program or other standard electrical architecture is used to control the frequency $f_1$ and $f_2$ of the current of the welding operation for electrode 12 and electrode 14. These frequencies are controlled separately to prevent arc interference. The operation of the invention as illustrated in FIG. 3 is shown in FIG. 4 wherein the frequency $f_1$ of electrode 12 is a low frequency but substantially greater than the frequency $f_2$ for electrode 14. Frequencies $f_1$ and $f_2$ have no relationship to the input line frequency of voltage source 44 and no relationship to the high frequency of inverter 42. Consequently, the present invention involves a tandem electrode welder wherein the output network creates a given low frequency for each of the tandem electrodes. The frequencies are independently controlled and have no relationship with each other. This welder is an advance in the art and is advantageous in high current welding which arc noise must be suppressed.

In the preferred operation, a low frequency AC welding current is created at both electrodes. However, a DC current is used in an alternative embodiment. Such embodiment includes single pole software switch 260 at the output of oscillator 252 and a double pole switch 262 connecting ground 264 to either terminal 270, terminal 272 or neutral terminal 274. Pull up resistor 266 is operative when switch 260 is opened. With switch 260 opened and switch 262 in the illustrated position grounding the set terminal S of flip-flop 240, switch SW1 is held closed and switch SW2 is held open. This provides a DC welding current with a position polarity. By shifting software switch 262 to ground terminal R of flip-flop 240, a negative welding current is established. During the DC welding operation, the voltage on line 230 can be controlled to give any wave shape such as pulses. These pulses are at a selected frequency but are no AC in operation. With switch 260 closed and switch 262 at neutral terminal 274, the preferred AC operation is implemented. The second power supply has the same alternative operation by including software switches 260a and 262a.

Figure 5:
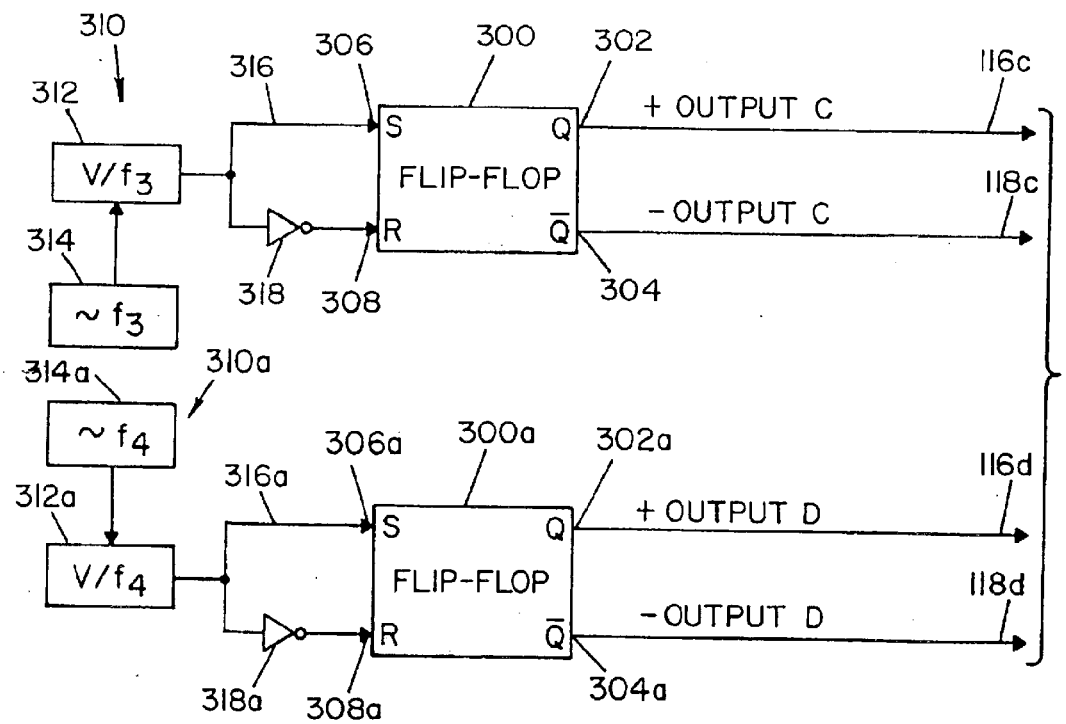
FIG. 5 is a wiring diagram showing a modification of the control circuit shown in FIG. 4.
Figure 6:
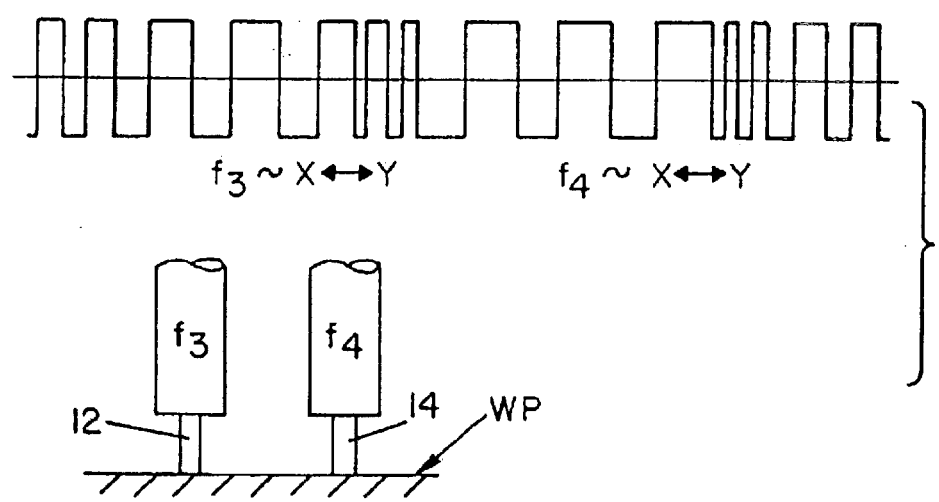
FIG. 6 is a view similar to FIG. 4 showing the operating characteristics of the control circuit shown in FIG. 5.

The embodiment of the invention illustrated in FIG. 3 allows the operator or welding engineer to adjust the individual frequency for electrodes 12 and 14 or apply a DC welding current across these electrodes, which electrodes are moved in unison along the path determined by joint J as shown in FIG. 1. By using power supply PS, as shown in FIG. 2, the frequency for the welding operation of each electrode is independently adjusted when the power supply PS is set for its preferred AC operation with switches 260 and 260a closed and switches 262 and 262a in the neutral position. This invention is further modified as illustrated in FIGS. 5 and 6. A software network illustrated as hardwired flip-flop 300 is used for controlling the logic on lines 116c, 118c to determine the frequency of the AC welding current at electrode 12. In this embodiment of the invention, software for controlling the frequency of the AC current at electrode 14 is shown as a hardwired flip-flop 300a. Flip-flop 300 and 300a are identical so the description of one flip-flop applies to the other, except flip-flop 300a controls the logic on lines 116d and 118d that are used to control the switching rate of switches SW1, SW2 in network 70 of power supply PS2 shown in FIG. 2. This controls the frequency of the welding current at electrode 14. Flip-flop 300 has output terminals 302, 304 which are non-coincident to control the logic on lines 116c, 118c. Set terminal 306 and reset terminal 308 are used to change the logic at terminals 302,304, in accordance with standard flip-flop technology. Circuit 310 is used to control the alternating logic applied to terminals 306, 308 and includes a voltage controlled oscillator 312 for controlling frequency $f_3$ in accordance with voltage from circuit 314. Circuit 314 sweeps the voltage on oscillator 312 between two extremes illustrated in FIG. 6 as X and Y representing a frequency in the general range of X=50 Hz and Y=200 Hz. Consequently, circuit 314 continuously adjusts the voltage at the input of oscillator 312 to change frequency $f_3$ continuously and alternately between two extremes both substantially within the low frequency region below about 200–300 Hz. In a like manner, control circuit 314a sweeps the frequency $f_4$ between two extremes, which in practice are the same extremes as used for frequency $f_3$. By sweeping frequencies $f_3$ and $f_4$ by circuits 314, 314a, which are not synchronized, there is random, continuous changing of frequencies $f_3$ and $f_4$ between two low frequency extremes. The frequencies are never fixed and have no relationship to each other. This operating characteristic is schematically illustrated in FIG. 6 where frequency $f_3$ for the welding operation of electrode 12 and frequency $f_4$ for the welding operation of electrode 14 randomly sweeps back and forth between the value X and the value Y so that there is no arc interference created by the instantaneous cross summation of electromagnetic waves. Circuits 314 and 314a are software programs that change frequency randomly; however, hardwired circuits are also available for this purpose. In the preferred embodiment as now implemented, the change in frequency that sweeps between two levels is done internally in the software implemented by the microprocessor of controller 200.

Figure 7:
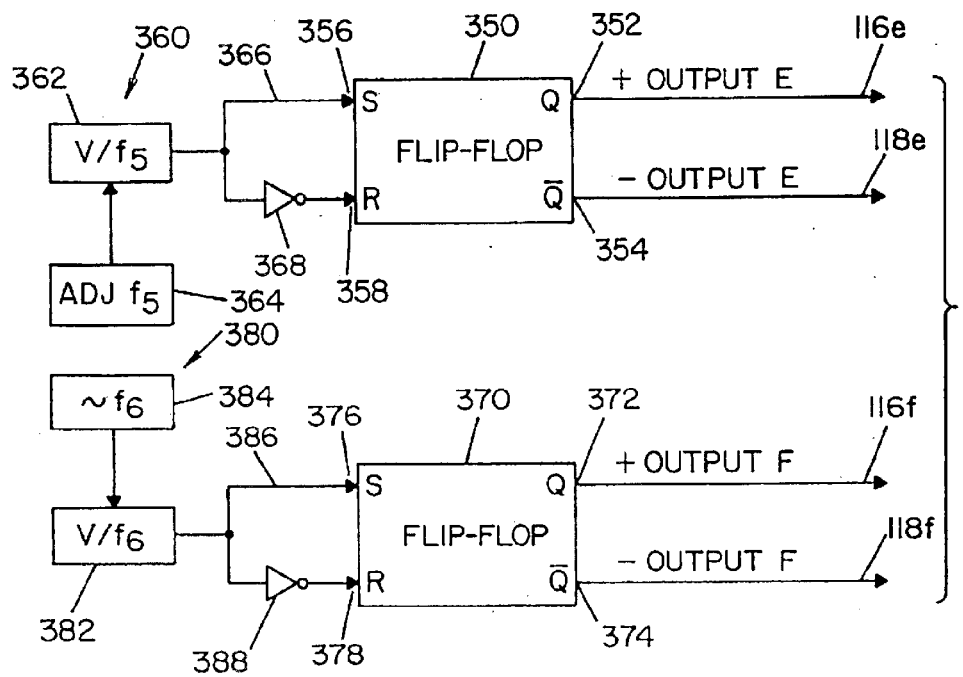
FIG. 7 is a wiring diagram showing still a further modification of the control circuit for independently controlling the low frequency of the current pulses at the two electrodes.
Figure 8:
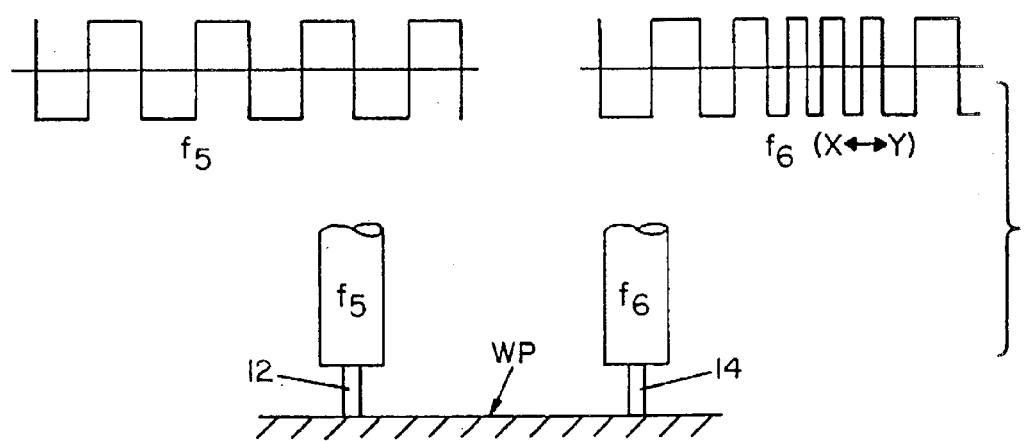
FIG. 8 is a view similar to FIG. 4 showing the operating characteristics of the control circuit of FIG. 7.

In accordance with another embodiment of the present invention when operated in the preferred AC mode, the frequency of one of the tandem electrodes is adjusted to a desired low frequency value and the other electrode is provided with a sweeping frequency. This is a combination of the concepts used in the embodiment of the invention shown in FIG. 3 and the embodiment shown in FIG. 5. This embodiment of the invention is shown in FIGS. 7 and 8 wherein frequency $f_5$ is adjusted to a fixed value for the switching frequency on output lines 116e and 118e. At the same time, frequency $f_6$ representing the frequency of output control lines 116f and 118f is variable between the low frequency extremes, such as 50 Hz and 200 Hz. To accomplish the objective of this embodiment of the invention, the software program in controller 200 incorporates a control circuit schematically illustrated as hardwired flip-flop 350 having output terminals 352, 354 controlling output lines 116e, 118e, respectively, a set input terminal 356 and a reset input terminal 358. Circuit 360 controls the frequency of the alternating logic on terminals 356 and 358 and includes a voltage controlled oscillator 362 with a frequency dictated by the adjusted voltage from control circuit 364. Output 366 is a pulsed signal for controlling the logic at terminal 356 and the reverse logic through inverter 368 at terminal 358. Oscillator 362 controls the frequency of the switching signals on output lines 116e, 118e. At the same time, the frequency $f_6$, which is the frequency for electrode 14, is controlled by a software program schematically illustrated as a hardwired flip-flop 370 having output terminals 372, 374, a set terminal 376 and a reset terminal 378. Circuit 380 includes a voltage to frequency oscillator 382 controlled by the variable voltage from circuit 384 to cause a sweep in frequency of the logic at output 386 connected to terminal 376 and of the inverted logic at terminal 378. The logic on output 386 is reversed by inverter 388. Consequently, electrode 12 is operated at an adjusted fixed frequency, whereas the tandem electrode 14 has a frequency that sweeps between X and Y, which in practice is 50–200 Hz. This operation is shown in FIG. 8.

The invention is also applicable to a pulsating welding current, which does not change polarities and is thus a DC current. This DC operation is implemented by software switches shown in FIG. 3. The DC pulsating current can create a series of current pulses through electrode 12 and through electrode 14 by a pulsating signal in line 230 during DC operation. The frequency of the DC current pulses is a low frequency and is adjusted as so far described with respect to the preferred AC operation of the invention.

Although the sweep circuits used in the AC implementation of the invention can gradually change between voltage X and Y, software can randomly select frequencies. There is no need to actually systematically sweep between various extremes of the voltage. The invention, either AC operation or pulsating DC operation, relates to the concept of producing frequencies that are random and are not determined by the input line frequency. The frequencies do not coincide, except occasionally. Consequently, without complicated circuitry, the arc interference is drastically reduced. Continuous DC operation with a wave shape controlled by the voltage on line 230 is an alternative using power supplies PS1 and PS2. Even though the description involves hard-wired circuits and block diagrams, in practice these operations are performed by software programs using standard technologies.

Figure 9:
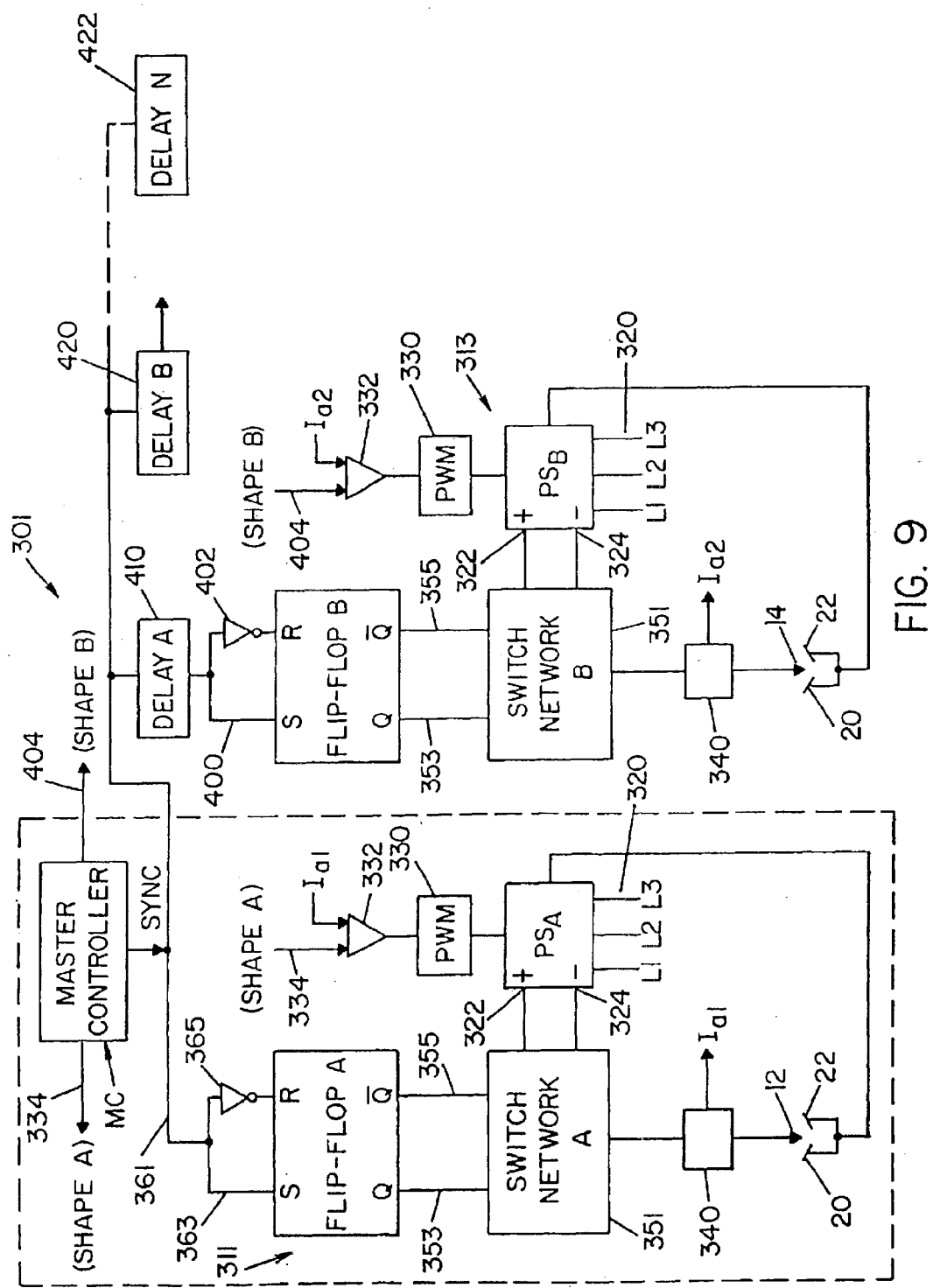
FIG. 9 is a wiring and block diagram of a system constituting a modification of the present invention using a synchronizing signal and a delay circuit to give a phase shift; and, FIG. 10 is a wiring and block diagram of a subroutine modifying a portion of the system shown in FIG. 11.

To provide a simplified phase shift implementation of the present invention, system 301 illustrated in FIG. 9 has been devised. Electrode 12 and 14 conduct alternating welding current from power supplies 311, 313, respectively. Power supply 311 include high frequency inverter $PS_A$ with a three phase input 320 and output terminals 322, 324. A pulse width modulator 330 causes the shape of the current pulses to be controlled by error amplifier 332 with a pulse shape input 334 from master controller MC. Arc current sensed from shunt 340 as voltage signal $1_{a1}$ is forced to follow the shape of the voltage signal from master controller MC on line 334. Switching network 351 is like network 70 shown in FIG. 2. The network alternates as the logic on lines 353, 355 is alternated by flip-flop A. The frequency of the welding current at electrode 12 is controlled by the frequency of changes in synchronizing line 361 through non-inverted input 363 and the inverted input 364 at terminals S, R, respectively. In a like manner, the frequency of the weld current at electrode 14 is controlled by the non-inverted input 400 and inverted input 402 of power supply 313. Other components of this second power supply are the same as the like components of power supply 311 and are numbered accordingly, except for pulse shape input 404 from master controller MC. The signal in line 361 is delayed slightly by delay circuit 410 to produce a phase shift between the AC welding currents of electrodes 12, 14. The delay is substantial less than 2 period of the frequency on synchronization line 361. If 60 Hz is used, delay is less than 5–6 ms.

In operation, system 301 has an AC synchronizing signal in line 361 with alternating positive commands and negative commands. In the illustrated embodiment, a positive command is a logic 1. The negative command is a logic 0. When the synchronizing signal on line 361 is a logic 1, a positive current pulse is caused by a logic 1 on line 353 and a logic 0 on line 355. When this positive command is created, delay circuit 410 delay a logic 1 on line 353 to flip-flop B. Thus, the weld current are out of phase by the delay of circuit 410. The low frequency of less than about 300 Hz is the same for both electrode 12, 14. Consequently, a simplified phase shift is provided using power supplies with the output switching networks shown in FIG. 2. If there are more than two electrodes, a further delay circuit 420 or up to N delays represent by delay 422 can be used.

Figure 10:
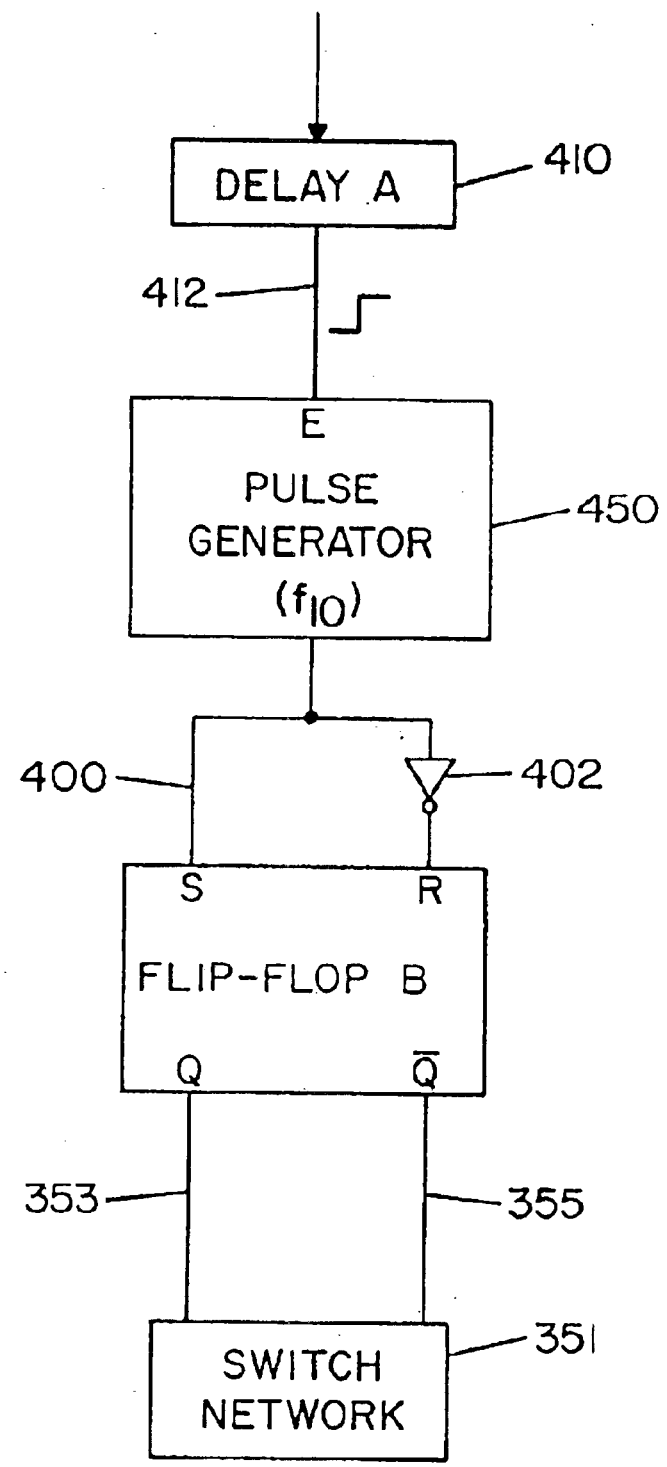

In accordance with the invention, the positive going command in synchronization line 361 can force the power supplies into a positive pulse. Thereafter this weld current will oscillate until a negative command forces the pulse into a negative pulse. By this concept used in an implementation of the invention, the frequency of the weld currents is higher than the frequency of the synchronization signal while maintaining a forced phase shift. Such a system is shown in FIG. 10 where the output of delay circuit 410 is a delayed synchronization signal. When the delayed signal shifts positive, i.e. to a logic 1 in line 412, pulse generator 450 starts operation at frequency $f_{10}$ with a forced first positive pulse. The next logic 1 in line 412 restarts the pulse generator with a forced positive pulse. These forced positive pulses are out of phase with similar forced pulses at flip-flop A by the delay of circuit 410. Consequently, the modification of system 301 as shown in FIG. 10 gives out of phase welding currents with frequencies determined at the individual power supplies, which frequencies are different. In the system of FIG. 10 without a pulse generator at the input of flip-flop A, flip-flop B is out of phase d frequency $f_{10}$ at flip-flop B is greater than the frequency of the synchronization signal operating flip-flop A.

Master controller MC is shown by the dashed lines as a component of the first power supply and associated circuits. The second power supply is driven from the controller associated with the first power supply. In another architecture, a master controller is a separate unit for driving all power supplies.

The systems are implemented by software in computers controlling the welders in accordance with standard practice. Combinations of software and hardware have also been used. The circuits can be modified to accomplish the concept of a synchronizing signal used to offset the welding currents and the low frequencies can be changed. To confine the magnitude of current during positive and negative pulse, master controller MC give magnitude voltage levels to error amplifiers 332. Indeed, the voltage on lines 334 and 404 can control magnitude and pulse shape in both polarities.

Having thus defined the invention, the following is claimed:

1. An apparatus for electric arc welding two spaced ends at a groove between said two spaced ends by melting an advancing welding wire d depositing said melted wire into said groove to join said spaced ends, said apparatus comprising power supply to create a series of small width current pulses constituting a welding cycle, said current pulses in said cycle each having a given electrical polarity of said advancing wire with respect to said two spaced ends; and, a selector to select the polarity of said current pulses in said cycle between a first polarity with said wire being positive and a second polarity with said wire being negative, said power supply including an inductor, a first switch to connect said inductor between said wire and said spaced ends, a second switch to connect said inductor between said wire and said spaced ends and said selector including a switch control to close either said first switch or said second switch during a given weld cycle.

2. The apparatus as defined in claim 1, wherein said inductor is a center tapped inductor and said first switch connecting a first portion of said inductor between said wire and said spaced end, said second switch connecting a second portion of said inductor between said wire and said spaced ends.

3. The apparatus as defined in claim 2, wherein said selector shifts between said first polarity and said second polarity at the beginning of a welding cycle.

4. The apparatus as defined in claim 3, wherein said selector includes a decoder with a first condition to select one of said first or second polarity for a first number of consecutive welding cycles and a second condition to select the other said polarity for a second number of consecutive cycles and a regulator to alternate between said first and second conditions during a welding operation.

5. The apparatus as defined in claim 4, wherein said first number of consecutive welding cycles is different from said second number of consecutive welding cycles.

6. The apparatus as defined in claim 5, wherein at least one of said welding cycles includes a short circuit transfer portion and a plasma arc melting portion.

7. The apparatus as defined in claim 6, wherein said welding cycles each have a desired arc current, said power supply includes a shunt to sense an actual arc current and an error amplifier to compare said actual arc current with the desired arc current to control a width of said current pulses.

8. The apparatus as defined in claim 7, wherein said power supply includes a pulse width modulator to create said current pulses at a frequency of at least about 10 kHz.

9. The apparatus as defined in claim 8, wherein said power supply includes a rectifier that directs a rectified current into a switching invertor, said switching invertor including a switch network operated at a frequency of at least about of 18 kHz.

10. The apparatus as defined in claim 2, wherein said selector includes a decoder with a first condition to select one of said first or second polarity for a first number of consecutive welding cycles and a second condition to select the other of said polarity for a second number of consecutive cycles and a regulator to alternate between said first and second conditions during a welding operation.

11. The apparatus as defined in claim 10, wherein said first number of consecutive welding cycles is different from said second number of consecutive welding cycles.

12. The apparatus as defined in claim 11, wherein said power supply includes a rectifier that directs a rectified current into a switching invertor, said switching invertor including a switch network operated at a frequency of at least about of 18 kHz.

13. The apparatus as defined in claim 10, wherein said power supply includes a rectifier that directs a rectified current into a switching invertor, said switching invertor including a switch network operated at a frequency of at least about of 18 kHz.

14. The apparatus as defined in claim 2, wherein at least one of said welding cycles includes a short circuit transfer portion and a plasma arc melting portion.

15. The apparatus as defined in claim 2, wherein said welding cycles each have a desired arc current, said power supply includes a shunt to sense an actual arc current and an error amplifier to compare said actual arc current with the desired arc current to control a width of said current pulses.

16. The apparatus as defined in claim 15, wherein said power supply includes a rectifier that directs a rectified current into a switching invertor, said switching invertor including a switch network operated at a frequency of at least about of 18 kHz.

17. The apparatus as defined in claim 2, wherein said power supply includes a rectifier that directs a rectified current into a switching invertor, said switching invertor including a switch network operated at a frequency of at least about of 18 kHz.

18. The apparatus as defined in claim 1, wherein said selector shifts between said first polarity and said second polarity at the beginning of a welding cycle.

19. The apparatus as defined in claim 1, wherein said selector includes a decoder with a first condition to select one of said first or second polarity for a first number of consecutive welding cycles and a second condition to select the other of said polarity for a second number of consecutive cycles and a regulator to alternate between said first and second conditions during a welding operation.

20. The apparatus as defined in claim 19, wherein said first number of consecutive welding cycles is different from said second number of consecutive welding cycles.

21. The apparatus as defined in claim 19, wherein at least one of said welding cycles includes a short circuit transfer portion and a plasma arc melting portion.

22. The apparatus as defined in claim 19, wherein said power supply includes a rectifier that directs a rectified current into a switching invertor, said switching invertor including a switch network operated at a frequency of at least about of 18 kHz.

23. The apparatus as defined in claim 1, wherein at least one of said welding cycles includes a short circuit transfer portion and a plasma arc melting portion.

24. The apparatus as defined in claim 1, wherein said welding cycles each have a desired arc current, said power supply includes a shunt to sense an actual arc current and an error amplifier to compare said actual arc current with the desired arc current to control a width of said current pulses.

25. The apparatus as defined in claim 24, wherein said power supply includes a rectifier that directs a rectified current into a switching invertor, said switching invertor including a switch network operated at a frequency of at least about of 18 kHz.

26. The apparatus as defined in claim 1, wherein said power supply includes a pulse width modulator to create said current pulses at a frequency of at least about 10 kHz.

27. The apparatus as defined in claim 1, wherein said power supply includes a rectifier that directs a rectified current into a switching invertor, said switching invertor including a switch network operated at a frequency of at least about of 18 kHz.

28. A method for electric arc welding two spaced ends at a groove between said two spaced ends by melting an advancing welding wire an depositing said melted wire into said groove to join said spaced ends, said method comprising:
   (a) providing a power supply that creates a series of small width current pulses constituting a welding cycle, said current pulses in said cycle each having a given electrical polarity of said advancing wire with respect to said two spaced ends;
   (b) selecting the polarity of said pulses in said cycle between a first polarity with said wire being positive and a second polarity with said wire being negative;
   (c) connecting a inductor across said wire and said spaced ends by closing a first switch;
   (d) connecting said inductor across said wire and said spaced ends by closing a second switch; and,
   (e) closing either said first switch or said second switch at a selected position in a given weld cycle.

29. The method as defined in claim 28, including the shifting between said first polarity and said second polarity at the beginning of a welding cycle.

30. The method as defined in claim 29, wherein said inductor is a center tapped inductor and said first switch connecting a first portion of said inductor between said wire and said spaced ends, said second switch connecting a second portion of said inductor between said wire and said spaced ends.

31. The method as defined in claim 30, wherein said cycles each have a desired arc current and including the step of sensing an actual arc current and comparing said actual arc current with said desired arc current to control a width of said current pulses.

32. The method as defined in claim 31, including the step of creating said current pulses at a frequency of at least about 10 kHz.

33. The method as defined in claim 32, including selecting one of said first or second polarity for a first number of consecutive welding cycles and selecting the other of said polarity for a second number of consecutive welding cycles and alternating between said polarities during a welding operation.

34. The method as defined in claim 33, wherein said first number of consecutive welding cycles is different from said second number of consecutive welding cycles.

35. The method as defined in claim 34, wherein at least one of said welding cycles includes a short circuit transfer portion and a plasma arc melting portion.

36. The method as defined in claim 35, including the rectification of an A.C. current and directing said rectified current into a switching invertor operating at a frequency of at least about of 18 kHz.

37. The method as defined in claim 36, including the rectification of an A.C. current and directing said rectified current into a switching invertor operating at a frequency of at least about of 18 kHz.

38. The method as defined in claim 29, wherein said cycles each have a desired arc current and including the step of sensing an actual arc current and comparing said actual arc current with said desired arc current to control a width of said current pulses.

39. The method as defined in claim 29, including selecting one of said first or second polarity for a first number of consecutive welding cycles and selecting the other of said polarity for a second number of consecutive welding cycles and alternating between said polarities during a welding operation.

40. The method as defined in claim 29, wherein at least one of said welding cycles includes a short circuit transfer portion and a plasma arc melting portion.

41. The method as defined in claim 29, including the rectification of an A.C. current and directing said rectified current into a switching invertor operating at a frequency of at least about of 18 kHz.

42. The method as defined in claim 28, wherein said inductor is a center tapped inductor and said first switch connecting a first portion of said inductor between said wire and said spaced ends, said second switch connecting a second portion of said inductor between said wire and said spaced ends.

43. The method as defined in claim 28, wherein said cycles each have a desired arc current and including the step of sensing an actual arc current and comparing said actual arc current with said desired arc current to control a width of said current pulses.

44. The method as defined in claim 43, including the step of creating said current pulses at a frequency of at least about 10 kHz.

45. The method as defined in claim 44, including the rectification of an A.C. current and directing said rectified current into a switching invertor operating at a frequency of at least about of 18 kHz.

46. The method as defined in claim 28, including selecting one of said first or second polarity for a first number of consecutive welding cycles and selecting the other of said polarity for a second number of consecutive welding cycles and alternating between said polarities during a welding operation.

47. The method as defined in claim 46, wherein said first number of consecutive welding cycles is different from said second number of consecutive welding cycles.

48. The method as defined in claim 46, including the rectification of an A.C. current and directing said rectified current into a switching invertor operating at a frequency of at least about of 18 kHz.

49. The method as defined in claim 28, wherein at least one of said welding cycles includes a short circuit transfer portion and a plasma arc melting portion.

50. The method as defined in claim 28, including the rectification of an A.C. current and directing said rectified current into a switching invertor operating at a frequency of at least about of 18 kHz.

* * * * *